Patented Apr. 19, 1932

1,855,072

UNITED STATES PATENT OFFICE

HERMANN SUIDA, OF MODLING, NEAR VIENNA, AUSTRIA

PRODUCTION OF CONCENTRATED ACETIC ACID

No Drawing. Application filed September 4, 1928, Serial No. 303,958, and in Germany August 15, 1927.

The United States patent specification No. 1,624,810 describes a process wherein the concentration of dilute acetic acid is performed with the aid of an organic solvent practically insoluble in water by causing the concentrated acetic acid to be taken up by the solvent on the "shaking out" principle from the dilute aqueous acetic acid and then recovering the acid in a concentrated form from the solvent by distillation in known manner.

All organic oleaginous substances which are more or less insoluble in water and which have a boiling point above 150° were found to be suitable for this process and a number of such substances were mentioned by way of example.

The United States patent specification No. 1,624,811 showed that this concentration of dilute acetic acid may also be performed by treating with the solvent the mixture of vapours resulting on evaporation of such a dilute acid, the mixture of water and acetic acid vapours being caused to pass through the liquid solvent.

Suida's United States Patent No. 1,796,059, dated March 10, 1931 points out that esters from monobasic or polybasic cyclic carboxylic acids with monovalent or polyvalent alcohols are particularly adapted for the purpose of acetic acid concentration from the vapour phase because these esters are scarcely volatile with water vapour, are practically insoluble in water and consequently all solvent losses are avoided when operating according to the process of patent specification No. 1,624,811.

It has now been found that the said compounds are also particularly suitable for operation in the liquid phase because their solubility in water or aqueous acetic acid is negligible.

It has also been found, however, that it is not necessary to perform the extraction in the liquid phase at normal temperature. On the contrary extraction in the vapour phase may advantageously be expedited by combining it with extraction in the liquid phase by causing the dilute acetic acid, particularly when acids free from residues are being employed, to enter in a liquid state into an extraction column which is of a construction suitable for vapour extraction.

Example I

A 12% acetic acid is caused to rise from below through a tower furnished with filling materials. From the upper end of the tower phthalic acid dibutyl ester flows downwardly in an equal proportion. The phthalic acid dibutyl ester takes with it on its way practically the whole of the acetic acid in a concentrated form while the rising water runs off at the upper end of the washing tower free from acetic acid. The extract flowing away at the bottom of the washing tower through an outlet and consisting of the phthalic acid ester and the concentrated acetic acid dissolved therein is converted in known manner into concentrated acetic acid by distillation and the solvent free from acetic acid is returned once more into the extraction process.

Example II

Preheated, dilute acetic acid, for example 25% acetic acid, is caused to flow into the upper part of a normal separating column connected with a rectifying column mounted thereon. Phthalic acid diethyl ester, in about equal proportion to the acetic acid supplied or in a somewhat greater quantity, runs in at the upper end of the rectifying column. At the lower end of the separating column a suitable heating device is provided whereby the downwardly flowing preheated dilute acetic acid is further heated and partially evaporated. The vapours from the dilute acetic acid rise through the separating column and the rectifying column and are practically freed from the acetic acid in this manner by the downwardly flowing solvent (phthalic acid diethyl ester) so that at the upper end of the rectifying column, which operates without a dephlegmator, water vapour only escapes practically free from acetic acid while the oil and the concentrated acetic acid dissolved therein collect in the lower part of the separating column. The extract so obtained passes down continuously through a siphon and is separated in known manner into the components. The advantage of this manner of operation resides in the fact that the acetic acid is only evaporated to a small extent and for the greater part is already taken up by the extraction agent in liquid condition. A material saving of heat is attained as compared with operation in the vapour phase alone.

Instead of phthalic acid dibultyl ester and diethyl ester use may equally well be made of phthalic acid dimethyl ester and dihexyl ester or of the esters of phthalic acid with even higher alcohols. Even various esters of the naphthene acids are, however, similarly suitable for the purpose stated. Furthermore other esters of monovalent or polyvalent cyclic carboxylic acids, for example high boiling esters of benzoic acid inter alia, may also be employed in place of the esters of phthalic acids and naphthene acids.

I claim:

1. In the recovery of concentrated acetic acid from dilute acetic acid by extraction of the acetic acid, the step of extracting the acetic acid in the liquid phase with an ester of a cyclic carboxylic acid and of an alcohol.

2. In the recovery of concentrated acetic acid from dilute acetic acid by extraction of the acetic acid, the step of extracting the acetic acid in the liquid phase with an ester of phthalic acid and of an alcohol.

3. The process of recovering concentrated acetic acid from dilute acetic acid by extraction of the acetic acid, consisting in causing the dilute acid to flow in an upward direction, causing at least a substantially equal amount of an ester of a cyclic carboxylic acid and of an alcohol to pass in the same direction, removing water vapor at the upper end of the stream of the two liquids, withdrawing the concentrated acetic acid in solution in the ester at the lower end of the stream, and separating said acid from said ester by distillation.

In testimony whereof I affix my signature.

HERMANN SUIDA.